E. I. DODDS.
STAY BOLT.
APPLICATION FILED SEPT. 21, 1912.
1,077,047.
Patented Oct. 28, 1913.
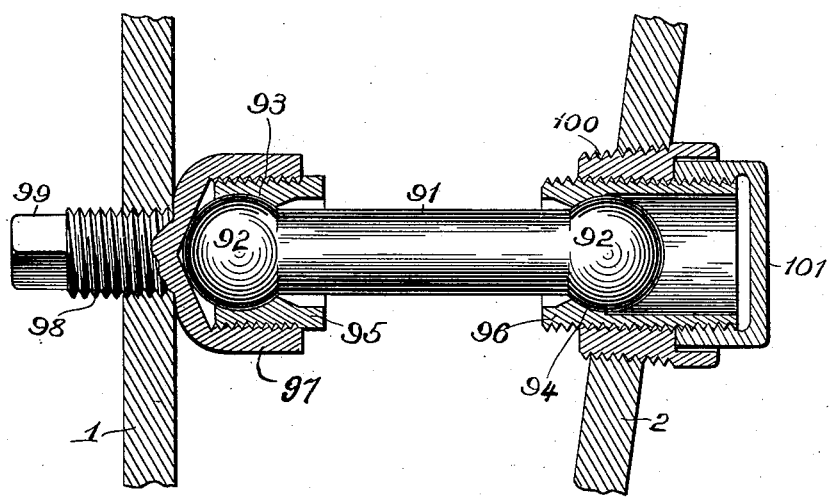
WITNESSES
INVENTOR
E. I. Dodds
By H. A. Seymour
Attorney

UNITED STATES PATENT OFFICE.

ETHAN I. DODDS, OF CENTRAL VALLEY, NEW YORK, ASSIGNOR, BY MESNE ASSIGNMENTS, TO FLANNERY BOLT COMPANY, OF PITTSBURGH, PENNSYLVANIA.

STAY-BOLT.

1,077,047. Specification of Letters Patent. Patented Oct. 28, 1913.

Original application filed September 25, 1911, Serial No. 651,051. Divided and this application filed September 21, 1912. Serial No. 721,669.

*To all whom it may concern:*

Be it known that I, ETHAN I. DODDS, a citizen of the United States, residing at Central Valley, in the county of Orange and State of New York, have invented certain new and useful Improvements in Stay-Bolts; and I do hereby declare the following to be a full, clear, and exact description of the invention, such as will enable others skilled in the art to which it appertains to make and use the same.

This invention relates to flexible bolts such as are employed for connecting the outside and inside plates of locomotive and other boilers, and is a division of application Serial Number 651,051, filed September 25th, 1911.

The object of the invention is to provide an improved stay bolt capable of a universal angular movement or yield at or near both ends thereof, so that the stay-bolt will be relieved of any vibration due to the expansion of the fire-box and crown sheets, and permitting the sheets to expand and contract at will.

Another object of the invention is to provide a stay-bolt that can readily be applied from the inside without the trouble and expense of dismantling the engine, and can be adjusted at any time, if necessary.

The accompanying drawing is a view in longitudinal section partly in elevation of a bolt embodying my invention.

1 represents the inside plate of a locomotive boiler, and 2 the outside plate.

The bolt shank 91 is made solid, and provided at each end with a spherical head 92. These heads engage concave seats 93 and 94 formed respectively in the externally threaded bushings 95 and 96. The bushing 95 is threaded into a connector 97, which latter has a threaded shank 98 engaging the wall 1, with a wrench hold 99 on its outer end. The bushing 96 is threaded through a cone bushing 100, which latter has a threaded engagement with the wall 2, and the outer end of said bushing is closed by a cap 101.

In the assembling of this structure, the bushings 95 and 96 are slipped on one end of the shank prior to the formation of one cylindrical head 92, after which the end of the shank is upset to form the head thus locking the bushings on the bolt shank. The device can be tensioned either by a wrench to the squared shank 99 or by turning up the opposite bushing 96. The cap 101 forms both a cap and a lock nut for the bushing 96.

It is evident that many slight changes might be resorted to in the relative arrangement of parts shown and described without departing from the spirit and scope of my invention as set forth in the claims annexed. Hence I would have it understood that I do not wish to confine myself to the exact construction and arrangement of parts shown and described, but Having fully described my invention what I claim as new and desire to secure by Letters-Patent, is:—

1. A stay bolt consisting of a bolt shank having a spherical head at each end thereof, threaded bushings on said shank, each bushing having a concave seat for a head, and connectors having threaded engagements with said bushings, one of said connectors having a closed outer end and a threaded shank integral with said closed end.

2. A stay bolt consisting of a bolt shank having a spherical head at each end thereof, threaded bushings on said shank each bushing having a concave seat for the head, a threaded bushing secured to one wall and having internal threads for engagement with one of the bushings on the shank, a combined cap and lock nut screwed onto said last mentioned bushing and bearing against the internally threaded bushing and a connector for connecting the bushing at the other end of the bolt to the other wall.

3. A stay bolt comprising a solid bolt shank having an upset spherical head at each end thereof, threaded bushings on said shank, each bushing having a concave seat for a head, an exteriorly threaded bushing secured to the inner wall and having internal threads for engagement with one of the bushings on the shank, a combined cap and lock nut for said connected bushings, and a connector for connecting the bushing at the other end of the bolt to the outer wall.

In testimony whereof, I have signed this specification in the presence of two subscribing witnesses.

ETHAN I. DODDS.

Witnesses:
 A. W. BRIGHT,
 GEO. F. DOWNING.